July 27, 1965
C. BRANDON
3,196,721
WIRE STRIPPING MACHINE
Filed Nov. 9, 1962
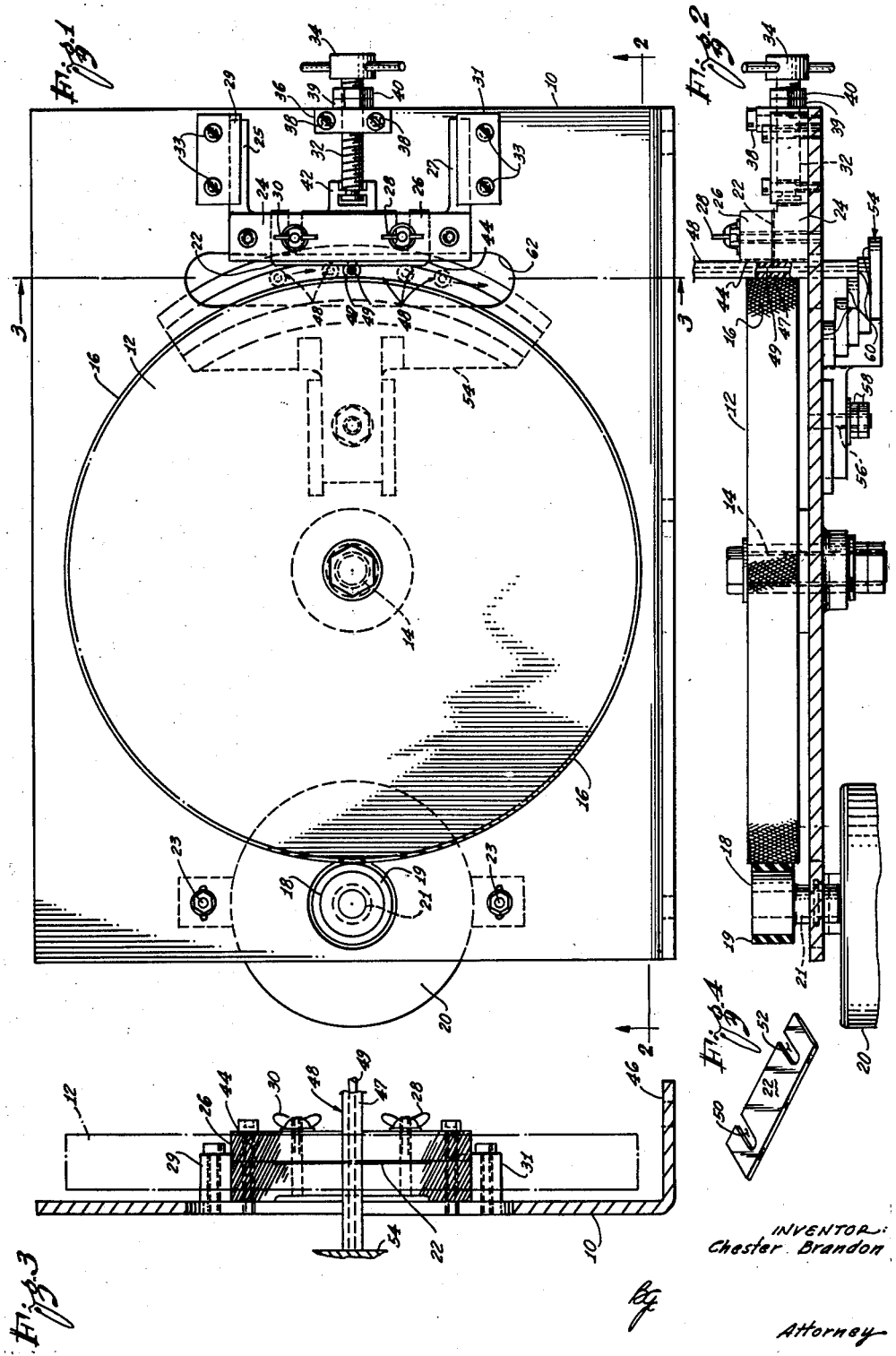
INVENTOR:
Chester Brandon
Attorney United States Patent Office 3,196,721
Patented July 27, 1965

3,196,721
WIRE STRIPPING MACHINE
Chester Brandon, Bethesda, Md., assignor to General
Precision, Inc., a corporation of Delaware
Filed Nov. 9, 1962, Ser. No. 236,616
2 Claims. (Cl. 83—8)

This invention relates to wire stripping machines, and more particularly to a novel wire stripping machine that rotates the wire over a blade to sever the insulation completely around its circumference and no deeper than the insulative material without harm, by the way of nicks or cuts, to the conductive material.

Insulation has been removed from cables or wires by various methods, but always great care had to be taken to prevent damage or destruction to the conductive material. This was especially true in the case of stranded wires. If a conductor is nicked it becomes weakened, or the loss of a number of strands from a stranded wire may occur, causing a weakness in the electrical connection. Conventional wire stripping machines use blades that cut by forcing the insulation against the conductive material, causing the blade to cut the insulation by shear resistance between insulation material and conductive material. Normally, the conductive material is copper, a relatively soft material that is easily cut or nicked. This method works fairly well if insulation is of a relatively soft material. The use of stronger insulating material, such as plastic, and more particularly Teflon, have made these old out-dated conventional methods obsolete. The reason is quite obvious. These tougher materials bend and stretch easily, making it difficult to cut. When the insulation is finally cut, there is so much pressure exerted against the conductive material, it is damaged; also, it is necessary to keep the blade so sharp that it usually cuts into the conductive material.

The present invention allows an operater to cut the insulation from a wire in a fraction of a second by rotating the wire over a knife blade. One end of the wire, the end to be prepared for electrical connection, is placed between a rotating wheel and a stationary platen which forces the wire to rotate over a blade embedded in the platen. The blade is gaged to cut no deeper than the insulation so that no damage is caused to the conductive material.

Therefore, it becomes an object of this invention to provide a means for severing the insulation of a conductive material without harming the conductive material.

Another object of this invention is to provide a wire stripping machine that will rotate a wire over a cutting edge, thus severing the insulation completely around the circumference of the wire.

Still another object of this invention is to provide a wire stripping machine that will sever the insulation of conductive materials of the same diameter without continuous adjustments.

A further object of this invention is to provide an adjustable means for severing the insulation of conductive materials of various sizes.

With these and other objects in view, as will hereinafter more fully appear, and which will be more particularly pointed out in the appended claims, reference is now made to the following description, taken in connection with the accompanying drawings in which:

FIGURE 1 is a frontal elevation of a preferred embodiment of the wire stripping machine incorporating the invention;

FIGURE 2 is a bottom view taken along the lines 2—2 of FIGURE 1;

FIGURE 3 is a section taken along the lines 3—3 of FIGURE 1, illustrating the cutting mechanism;

FIGURE 4 is a perspective view of the cutting blade of the wire stripping machine.

Referring now to the drawings wherein like reference characters designate like or corresponding parts throughout the several views, there is shown in FIGURE 1 (which illustrates a preferred embodiment) a standard 10 for mounting components and mechanisms thereon for operation of the wire stripping machine, having a wheel 12 mounted on a rotatable shaft 14 that is secured to standard 10 by suitable bearings. The wheel 12 is knurled around the periphery 16 and is rotated on the shaft 14 by a pinion 18 which has a rubber wheel 19 around its periphery. A motor 20 which is mounted to the standard 10 by bolts 23 rotates pinion 18, which, in turn, drives the wheel 12 in a clockwise rotation. Blade 22 is adjustably mounted on mount 24 and is clamped by plate 26 and wing nuts 28 and 30 so that the cutting edge of blade 22 is spaced a desired distance from the knurled periphery 16 of wheel 12. Blade 22 is stationed in a relative close proximity to the wheel 12 and is held in place by the mount 24 and clamped in place by plate 26 and by the wing nuts 28 and 30. When wing nuts 28 and 30 are loosened, the cutting blade 22 can be adjusted to correspond to the size of the wire to be stripped.

The mount 24 is adjustable toward or away from wheel 12 by providing it with a slide 25 extending from its upper portion and a similar slide 27 from its lower portion. Slides 25 and 27 are adjustably retained to the housing by a pair of guides 29 and 31, respectively, which are rigidly mounted to standard 10. The mount 24 can now be adjusted to slide horizontally with the horizontal center line of the wheel 12. A threaded member 32 for providing this adjustment is connected to the mount 24 by the connector 42 and retained to the standard 10 by the guide block 36. The guide block 36 is attached to the standard 10 by the bolts 38 and has an internal threaded portion 39 to mate with threaded member 32. The threaded member 32 has a handle 34 to facilitate adjusting the mount 24 horizontally. The threaded member 32 has a lock nut 40 for clamping the mount 24 in a locked position.

Referring now to FIGURE 3, showing a side view of the cutting apparatus, the numeral 44 designates a platen that has a knurled face and that is rigidly attached to the face of mount 24 and plate 26 to grip the wire being stripped, as will be described hereafter. Standard 10 has an extension 46 so that the stripping machine may be bolted to a work bench, or the like.

FIGURE 4 is the view of a knife blade 22 which has a pair of slots 50 and 52. These slots are provided for adjusting the blade 22 to move in and out horizontally independently of the mount 24. Also, in FIGURE 1 is shown the blade 22 placed between the plate 26 and the mount 24 and held in place by the wing nuts 28 and 30 which are threaded into standard 10. When the wing nuts 28 and 30 are loosensed, the blade 22 can be moved in and out to correspond to the depth of the desired cut. Attached to standard 10 on the opposite side of the cutting mechanism is a gage block 54 which is retained to standard 10 by the threaded members 56 and the nut 58. The gage block 54 has a plurality of steps 60 which are aligned with the cutting mechanism previously described, providing a stop for the wires to be stripped, so that all wires may be identically stripped. At this point standard 10 has a slot 62 cut therein and of sufficient dimensions to allow the wire 48 which is inserted against a step 60 of gage block 54 to roll with the wheel 12 over the platen 44.

*Operation*

When the machine is operating, the motor 20 rotates the shaft 21 in a counterclockwise rotation. On the shaft 21 is the pinion 18 which has a rubberized wheel 19 that meshes against the larger wheel 12. This larger wheel 12 will then be rotated in a clockwise rotation. A wire 48 is fed into the top of the machine between the wheel 12 and the platen 44 which causes the wire 48 to rotate in a counterclockwise rotation. The length of the platen 44 and the length of the time the wheel 12 forces the wire 48 against platen 44 is calculated to assure the wire 48 at least a 360° rotation. As the wire 48 is rotated it passes over the blade 22, severing the insulation from the wire 48 completely around its circumference. For proper insulation severing the distance between the wheel 12 and the blade 22 is gaged to be the combination of the thickness of the insulation 47 and the conductor 49. This allows the blade 22 to cut no deeper than the insulation 47, thus leaving the conductor 49 uncut and unharmed. If it happens that the wire 48 might be of the stranded type, this invention allows the strands to be left intact and uncut. The distance between the wheel 12 and the platen 44 is also gaged to be no further apart than the thickness of the outside diameter of the wire 48. This assures that the knurled periphery 16 of wheel 12 will force wire 48 against platen 44 and thereby complete rotation of wire 48.

The description given is for the preferred embodiment and is designed for smaller wires. If larger wires are to have the insulation severed, it may become necessary to have the platen 14 and blade 22 curved to correspond to the circular curvature of the wheel 12. This will allow a longer duration that the blade 22 and platen 44 remain in contact with the diameter of the wire 48, assuring that the cut extends completely around the diameter of the wire 48.

While there has been described what is at present considered to be the preferred embodiment of this invention, it will be understood that various modifications may be made therein, such as replacing the knurled platen and wheel periphery with rubber, or other friction material, and it is intended to cover in the appended claims all such modification as falls within the true spirit and scope of this invention.

What is claimed is:

1. A machine for circumferential severing insulation of an insulated conductor comprising: a standard having a slot therein, a rotatable wheel mounted on said standard, said slot positioned in said standard vertically along a circumferential edge of said wheel, a platen spaced adjacent the periphery of said wheel on one vertical edge of said slot in said standard and adjustably mounted to move along the radii of said wheel, a blade embedded in said platen and having a cutting edge protruding therefrom, said blade adjustably mounted to slide independent of said platen, a gauging block means provided to gauge the length of insulation removed from said insulated conductor having a plurality of spaced steps positionably mounted under said slot in said standard and opposite said rotatable wheel, said gauging block being adjustably positioned contiguous to the periphery of said wheel, and, a positioning means adapted to position a selected step of said gauge block beneath said slot of said standard.

2. A machine for circumferential severing insulation on an insulated conductor comprising: a standard having a slot therein, a rotatable wheel having a knurled periphery and mounted on said standard, said slot positioned in said standard vertically along a circumferential edge of said wheel, a platen having a knurled face and spaced adjacent the periphery of said wheel on one vertical edge of said slot in said standard and adjustably mounted to move along the radii of said wheel, a blade embedded in said platen and having a cutting edge protruding therefrom, said blade adjustably mounted to slide independent of said platen and a gauging block means provided to gauge the length of insulation removed from said insulated conductor having a plurality of spaced steps positionably mounted under said slot in said standard and opposite said rotatable wheel, said gauging block being adjustably positioned contiguous to the periphery of said wheel, positioning means adapted to position a selected step of said gauge block beneath said slot of said standard.

References Cited by the Examiner

UNITED STATES PATENTS

| | | | |
|---|---|---|---|
| 2,268,820 | 1/42 | Hannan | 82—100 XR |
| 2,321,735 | 6/43 | Clifford | 82—101 XR |
| 2,552,674 | 5/51 | Haren | 83—434 |
| 2,657,601 | 11/53 | Bentley | 81—9.51 |
| 3,016,654 | 1/62 | Lutz | 225—96 |

FOREIGN PATENTS

| | | |
|---|---|---|
| 1,001,367 | 1/57 | Germany. |
| 135,191 | 6/60 | Russia. |

ANDREW R. JUHASZ, *Primary Examiner.*

HUNTER C. BOURNE, JR., *Examiner.*